(12) United States Patent
Davis et al.

(10) Patent No.: US 8,185,494 B2
(45) Date of Patent: May 22, 2012

(54) DATA-DRIVEN SYNCHRONIZATION

(75) Inventors: Darren R. Davis, Woodinville, WA (US); Myron C. Thomas, Newcastle, WA (US); Michael R. Clark, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 11/855,864

(22) Filed: Sep. 14, 2007

(65) Prior Publication Data
US 2009/0077138 A1    Mar. 19, 2009

(51) Int. Cl.
*G06F 7/00* (2006.01)

(52) U.S. Cl. .................. 707/610; 707/625; 715/203

(58) Field of Classification Search ............... 707/8, 610
See application file for complete search history.

(56) References Cited

U.S. PATENT DOCUMENTS

| | | | |
|---|---|---|---|
| 5,333,299 A | | 7/1994 | Koval et al. |
| 5,706,509 A * | | 1/1998 | Man-Hak Tso ............... 707/625 |
| 7,177,865 B2 | | 2/2007 | Sasaki et al. |
| 2003/0041174 A1 | | 2/2003 | Wen et al. |
| 2003/0088755 A1 | | 5/2003 | Gudmunson et al. |
| 2003/0191827 A1 | | 10/2003 | Piispanen et al. |
| 2004/0006551 A1 | | 1/2004 | Sahinoja et al. |
| 2004/0103098 A1 | | 5/2004 | Mitra |
| 2004/0153473 A1 * | | 8/2004 | Hutchinson et al. ....... 707/104.1 |
| 2005/0033829 A1 | | 2/2005 | Oommen |
| 2005/0216524 A1 | | 9/2005 | Gomes et al. |
| 2006/0026168 A1 * | | 2/2006 | Bosworth et al. ............... 707/10 |
| 2006/0069809 A1 * | | 3/2006 | Serlet ............................. 709/248 |
| 2006/0085485 A1 | | 4/2006 | Shimshoni |
| 2006/0172724 A1 | | 8/2006 | Linkert |
| 2006/0277224 A1 | | 12/2006 | Aftab et al. |
| 2007/0100834 A1 | | 5/2007 | Landry et al. |
| 2007/0130217 A1 | | 6/2007 | Linyard et al. |

OTHER PUBLICATIONS

Maria Burtico. Enterprise Data Access from Mobile Computers: An End-to-end Story. http://ieeexplore.ieee.org/iel5/6756/18062/00836494.pdf?tp=&isnumber=18062&arnumber=836494. Last accessed Jul. 23, 2007.
Synchronizing and Managing Mobile Devices http://www.ianywhere.com/downloads/whitepapers/sync_managing_wp.pdf. Last accessed Jul. 23, 2007.
Understanding Handheld Mobility for the Enterprise http://www.fingertipware.ca/pdfs/UnderstandingHandheldMobilityfortheEnterprise.pdf. Last accessed Jul. 23, 2007.
Wireless Database Synchronization Standards and Solutions. Ola Winberg. May 4, 2007 Issue 1.0. FMV Document ID 303/2006. Unit AK Led. Subject Code 09700. Assignment ID LedsystT. Ref. ID LT1K P05-0568. p. 1. http://www.fmv.se/upload/Bilder%20och%20dokument/Vad%20gor%20FMV/Uppdrag/LedsystT/%C3%96vergripande%20FMLS-dokument/Generiska%20designdokument/LT1K%20P05-0568%20Wireless%20database%20synchronization%20standards%20and%20solutions%201.0.pdf. Last accessed Jul. 23, 2007.
International Search Report Dated Feb. 25, 2009, for PCT Application Serial No. PCT/US2008/076262, 11 pages.
European Office Action dated May 26, 2011 for European Application No. 08799519.7, 3 pages.

* cited by examiner

*Primary Examiner* — Fazlul Quader

(57) ABSTRACT

Synchronization is bound to data and optionally a set of synchronization behaviors as opposed to a particular application and/or endpoint. As a result, synchronization amongst endpoints need not require creation of customized synchronization solutions or rely on vendor and/or application specific mechanisms. In one instance, standard data and/or synch schemas can be subscribed to and utilized to dynamically configure synchronization across endpoints.

20 Claims, 12 Drawing Sheets

DATA-DRIVEN SYNCHRONIZATION

BACKGROUND

Numerous applications exist today that will synchronize data between two endpoints utilizing one of two general models, namely replication of a data repository from one location to another or transfer of data between a host store and a client store. Classic examples of the first case involve database replication across a database cluster or between a web-based host and a client-based application. A key to this model is that data is transferring within a well-defined pattern among participants that are typically under complete control of a data management system from a software development point of view. The second case, referred to in this context as cross-store synchronization, is much more fragile because it typically involves transferring data between endpoints that do not have the same level of support for items in the data set. A classic example is synchronizing between a desktop computer and a portable device such as a mobile phone or portable media player.

To cope with challenges of cross-store synchronization a conventional solution is to create an application stack on top of a custom protocol that connects host and client devices. A synchronization stack vendor also typically writes one or more synch providers for both the host and client device to enable this conduit to carry data from applications, such as an email program. Once these providers have been installed on both a desktop computer and a portable device, for instance, synchronization through the conduit is possible. Of course, the reach of these solutions is limited to the amount of work that a stack vender is willing to perform. For example, if a stack vendor does not provide support for a particular data source on a host, it is not possible to synchronize content from that source to a client.

Sometimes a stack vendor will make the system available to third parties to allow them to also create providers that work at both ends of the pipe and thereby encourage a broader synchronization ecosystem. Nevertheless, because all aspects of the conduit are written by a stack vender, solutions are locked into a particular vendor and are limited by where the vendor makes the stack available.

In the end, most vendors that desire to ship solutions to synchronize their application with any portable device, or portable device manufactures that wish to support synchronization of applications, purchase a third party solution, develop their own, or simply decide against offering such functionality.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data-driven synchronization. A broad synchronization system and associated methods are provided that are unbound by applications and/or endpoints. Rather than an application stack or silo-based approach wherein proprietary code from a single vendor is required on both sides of a synchronization pipe, a model-based approach is presented that defines how information is exchanged to effect synchronization across data sets and/or sources of data sets. In this manner, any source can be synchronized with any destination.

In accordance with one aspect of the subject disclosure, synchronization can be performed as a function of a sync model to which endpoints subscribe. The sync model defines data and how that data is exchanged using a particular protocol for purposes of synchronization. Endpoints negotiate to establish a specific sync model that enables communication and/or interaction with respect to data synchronization. Subsequently, synchronization components can be configured to implement designated behavior regarding synchronization and data exchange.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Data synchronization systems and methods are provided hereinafter that achieve source and destination agnosticism. As a result, applications and endpoints are able to deliver sync functionality without being bound to application and/or endpoint specific solutions. Rather, synchronization is bound to data and a set of synchronization behaviors. More particularly, synchronization can be performed as a function of data schema and optimized with a synchronization model. Built on top of a rich yet primary communication protocol, additional layers are employed to define data and how that data is exchanged for purposes of synchronization. Further, a data schema and sync model can be negotiated between any source and any destination to configure optimal synchronization dynamically across different stores and/or endpoints.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
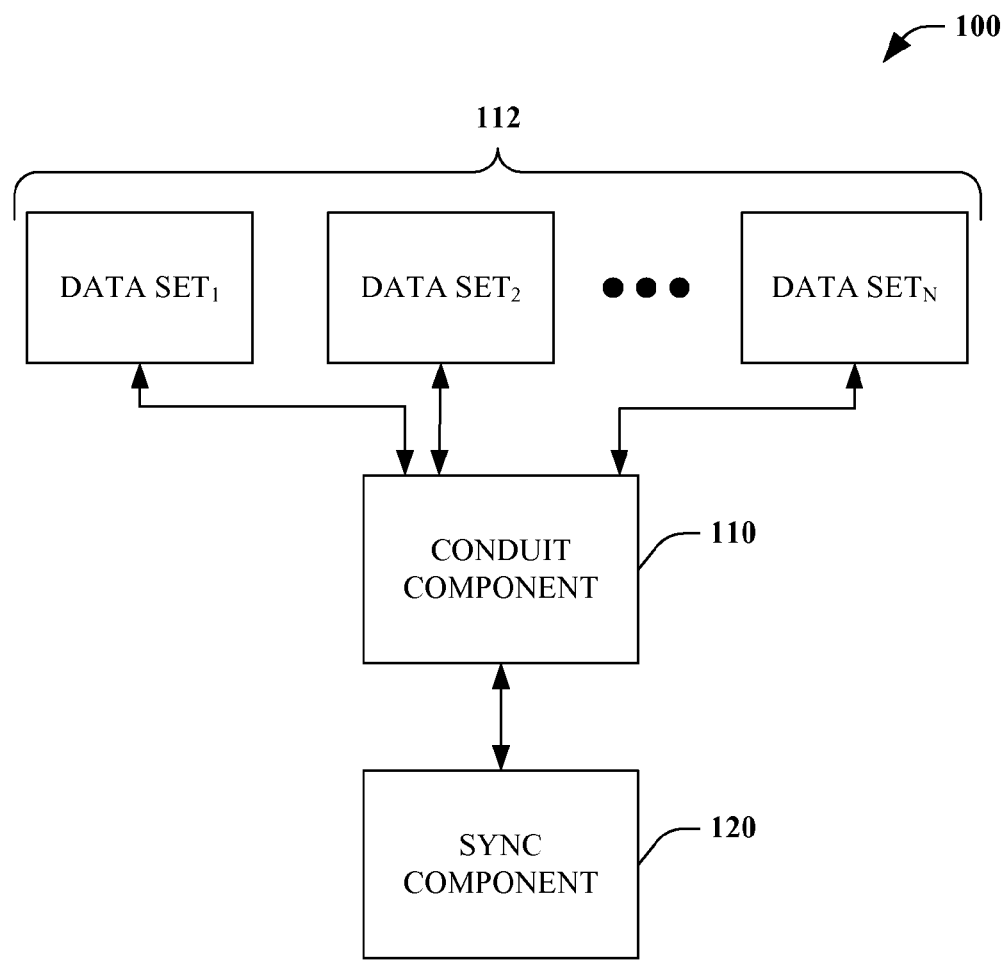
FIG. 1 is a block diagram of a data-driven synchronization system in accordance with an aspect of the disclosed subject matter.

Referring initially to FIG. 1, a data-driven synchronization system 100 is provided in accordance with an aspect of the claimed subject matter. The system 100 includes a conduit component 110 that enables communication amongst a number of data sets 112 (1 through N, where N is an integer greater than one). By way of example, the conduit component 110 can correspond to, include, and/or implement a data transport mechanism or protocol enabled to extract information from data sets 112 (e.g. Media Transport Protocol (MTP)). The data sets 112 can be embedded within a plurality of associated endpoints or devices such as mobile devices, desktop computers, and servers, among other things. The conduit component 110 is communicatively coupled to the sync component 120 and operable to provision or afford data thereto. The sync component 120 employs the conduit component 110 to facilitate synchronization of two or more data sets 112. As will be described further infra, synchronization can be performed between endpoints identified as a host and a client, wherein the host can drive synchronization across one or more clients.

In accordance with an aspect of the claimed subject matter, the system 100 can synchronize data sets 112 unbound by associated applications and/or endpoints. In other words, data synchronization is not confined to functionality provided by a related application or device vendor. Instead, synchronization is data-driven or bound by data and optionally a set of synchronization behaviors.

Consider a conventional silo synchronization system typically employed in cross-store scenarios where stores do not include the same level of support for items in a data set (e.g., fidelity loss). In this system, a provider supplies code that can be plugged in at the top of a silo and at the bottom of the silo to make sure all necessary synch functionality occurs in between. Since code is running on both sides (e.g., source and destination), it is the provider's responsibility to make sure all fidelity issues are properly handled.

The conventional system has a couple problems. First, generic applications are at the mercy of the sync silo author in order to synchronize data across such applications. Additionally or alternatively, endpoints are similarly bound by a given sync silo. In response, a custom synchronization solution can be developed or synchronization may not be offered. Here, the system 100 provides a mechanism for synchronizing data that achieves source application and destination agnosticism. As a result, application and/or portable device vendors have an opportunity to deliver desired functionality at a lower cost rather than creating their own solutions or licensing a restrictive solution.

As will be appreciated in light of further description infra, in order to achieve a rich level of application and/or endpoint independence and encourage strong support from a number of different vendors a common well-defined standardization solution can be employed. Further, to cope with a variety of applications and endpoints it is generally inappropriate to consider traditionally constructed silo synchronization stacks as a model. Alternatively, rather than focusing on applications and/or endpoints being synchronized (e.g., top and bottom of a silo), synchronization can focus on the way endpoints communicate to enable a rich synchronization experience (e.g., middle of a silo). In one implementation, standardized communication mechanisms can be provided to encourage development at the top and bottom to provide rich synchronization options.

Figure 2:
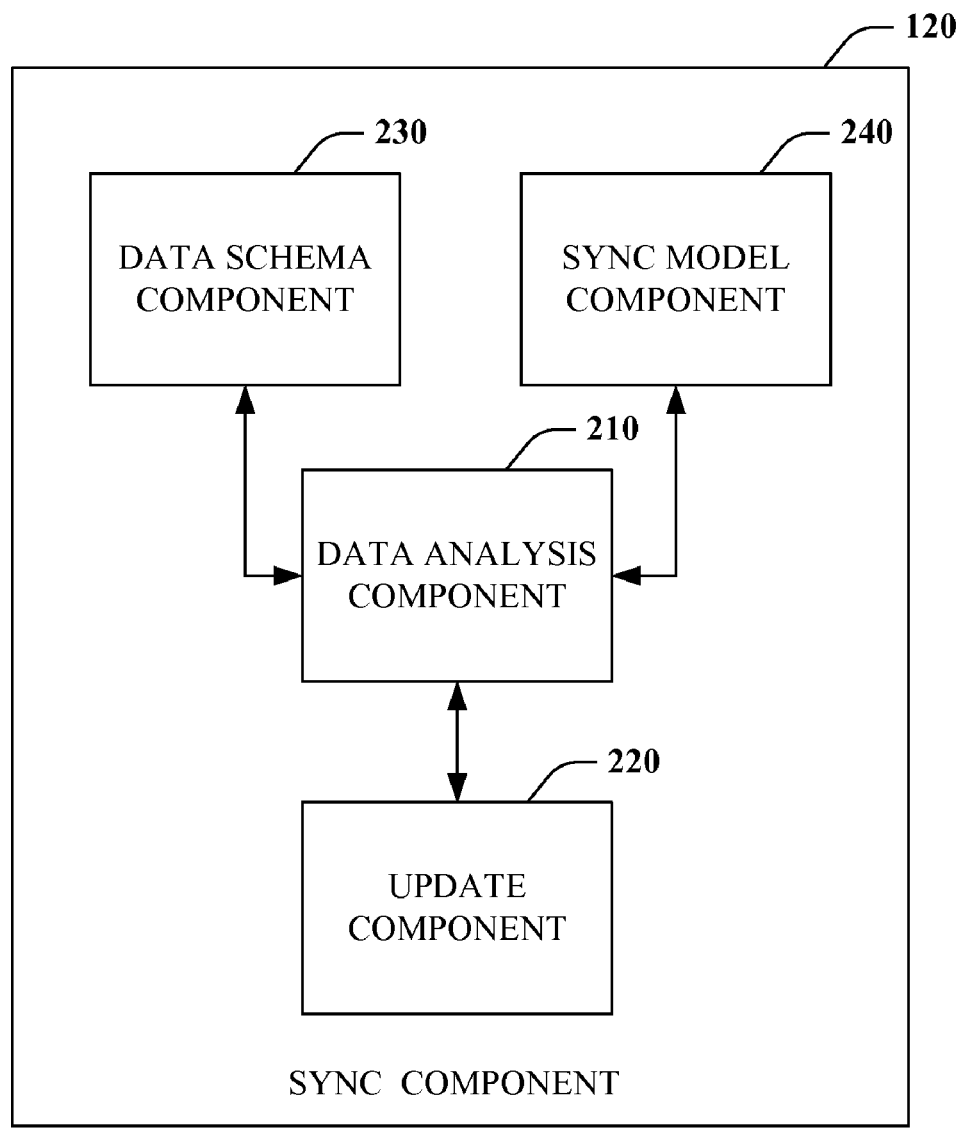
FIG. 2 is a block diagram of a representative sync component that enables data synchronization.

Turning attention to FIG. 2, a representative sync component 120 is depicted in accordance with an aspect of the claimed subject matter. The sync component includes a data analysis component 210 and an update component 220. These two components 210 and 220 are responsible for base synchronization functionality. More specifically, the data analysis component 210 analyzes two or more data sets to determine how the sets need to be altered, if at all, to synchronize the sets. The update component 220 facilitates altering one or more data sets as a function of the analysis afforded by the data analysis component 210.

Additionally, the sync component 120 includes data schema component 230 and sync model/schema component 240 that influence the data analysis component 210. The data schema component 230 defines data to be exchanged. The sync model component 240 (also referred to herein as sync or synchronization schema component) specifies how data is to be exchanged for purposes of synchronization. In other words, data and synchronization schemas can be supplied to the data analysis component 210 to customize its operation. In particular, such schemas can control what data is exchanged and how that data is exchanged to synchronize two or more data sets.

In one instance, the data schema component 230 and sync model component 240 can acquire schemas for provisioning to the data analysis component 210, for instance from a website or other network location. Alternatively, the components 230 and 240 can correspond to the schemas themselves. In either case, the schemas can be denoted in a plurality of different manners including but not limited to XML (eXtensible Markup Language) or compile time generated binary structures.

Figure 3:
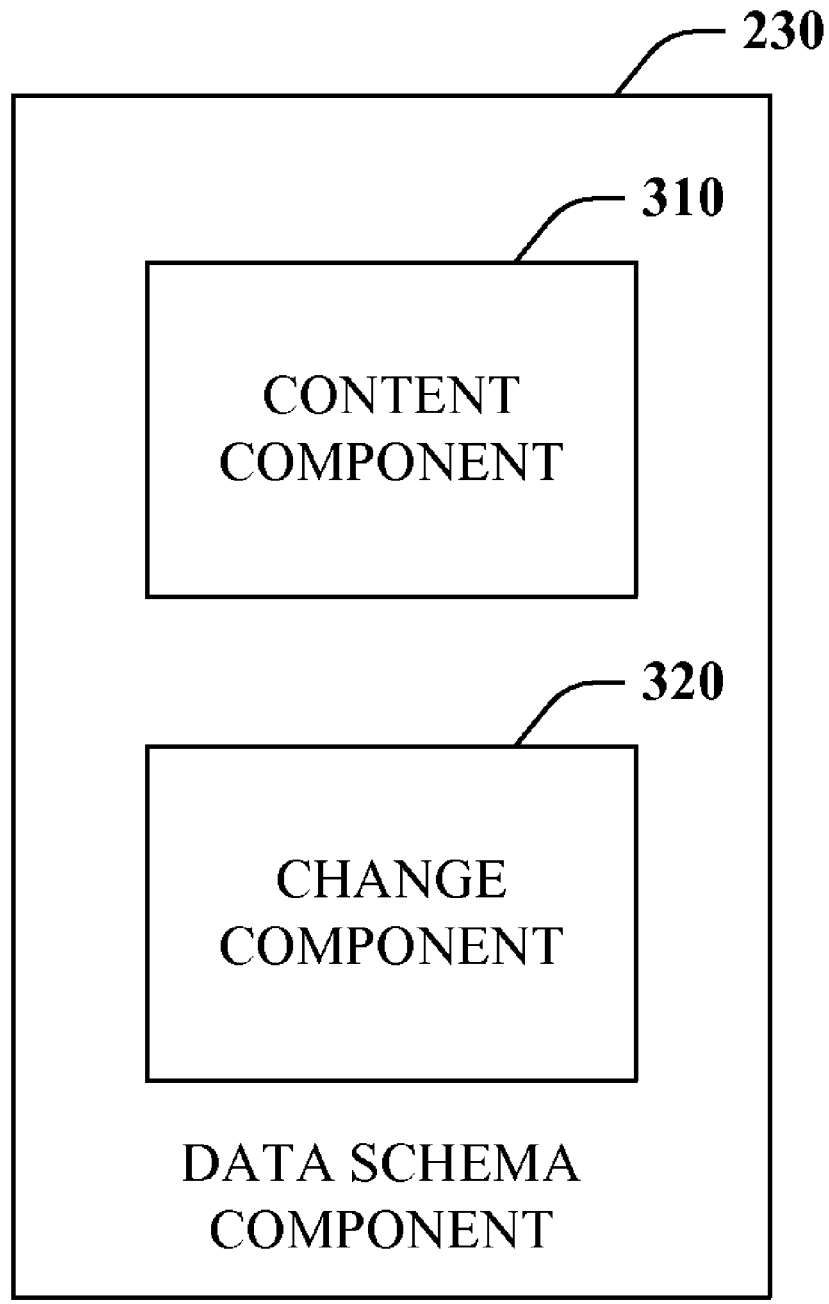
FIG. 3 is a block diagram of a representative data schema component or output thereof.

FIG. 3 illustrates a representative data schema component 230 or output thereof in accordance with an aspect of the claimed subject matter. Data sets do not always include the same information or level of fidelity with respect to synchronization. For instance, a mobile device store associated with a personal information manager (PIM) application typically will not include the same data as a desktop store, especially if the applications are created by different manufacturers. To resolve this issue, content component 310 can describe data subject to synchronization. This enables a synchronization host and client to speak the same data exchange language.

By way of example, a synchronization host that speaks in terms of contact objects should not be able to synchronize with a client that speaks calendar objects. If, however, both host and client speak the same content type, such as contact objects, they should be able to participate in a sync relationship. Note that it is assumed that content type implies a particular format for the data. In other words, if two endpoints both indicate that they speak "contacts," it is assumed that they are referring to the same contact format (e.g., first name, last name, street address, city, state, and zip code). This is not strictly required but simplifies synchronization. A transformation can be performed to map differing formats to a particular standardized and/or publicized format where necessary.

The data schema component 230 also includes a change component 320 to identify units of change associated with data described by the content component 310. It is sufficient to simply say that because a synchronization host and client both speak the same content type that data synchronization can be performed. Nevertheless, to maximize synchronization performance only the minimum amount of data that changed should be transferred from one endpoint to another. In some cases, it makes sense to separate particular items in a data set as a change unit, because they tend to change frequently while other items may be more efficiently managed when grouped. For instance, an email address may change frequently and as such be designated as a separate change unit, while a physical address including street name, city, state, and zip code may be grouped as a single change unit.

Figure 4:
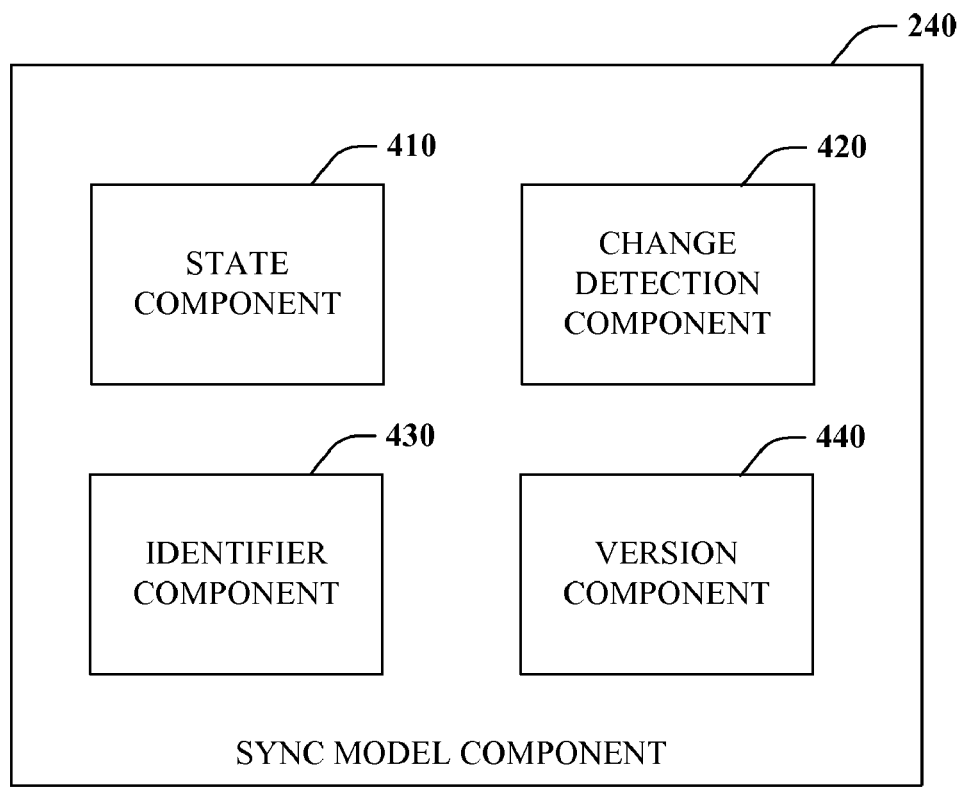
FIG. 4 is a block diagram of a representative sync model/schema component or output thereof.

FIG. 4 depicts a representative sync model/schema component 240 or output thereof according to an aspect of the claimed subject matter. As previously mentioned, the sync model component 240 identifies how data is exchanged to effect synchronization. The representative component 240 includes state component 410 and change detection component 420.

The state component 410 is a model for describing current state of synchronization in a content-type independent manner. Consider a generalized sync operation that performs the following operations in the order shown:
1. Determine what changed on a first endpoint since the last sync operation with a second endpoint.
2. Determine if the second endpoint has the changes already on the first endpoint by examining an object on the second endpoint.
   i. If the data is the same, ignore the change.
   ii. If the data is not the same and only one side has changed, synchronize the most recent change from one side to the other.
   iii. If the data is not the same and the change unit has changed on both sides, use some form of viewer to resolve conflicts between the two changes.
3. Copying changes from the first endpoint to the second endpoint.

Without rich information about synchronization state on an endpoint, typically the only way to perform act two is to enumerate each item in the change set (from act one), discover what changed and then locate the corresponding item on the second endpoint (which could degenerate to enumerating and looking for a match if a common sync ID is not shared) and then examining each of the properties in the change unit to see if they are different. For simple properties or datasets, the comparison may not be a performance concern, but for larger properties or datasets, this comparison can be very expensive. By introducing the current state of synchronization, the data analysis component 210 of FIG. 2 can query a state store rather than an object directly to determine if changes need to be made.

The change detection component 420 describes the manner in which changes are identified on one side or another. Many possibilities exist for identifying changes. For example, whichever endpoint is driving a synch operation can fully interrogate another store utilizing a full enumeration model. In an anchor-based approach, a store has to manage or actually provide changes or deltas but those deltas may not be in an optimum form or language for a sync operation to occur. Alternatively, similar to the anchor-based model deltas can be provided but in a way that is optimum or substantially optimum with respect to the way sync metadata among other things is managed. Still further yet, in a service model everything can be packed and sent to a service (e.g., web service) that will do all the work and return results.

The sync model component 240 also includes identifier component 430 and version component 440 to further facilitate synchronization. The identifier component 430 provides a context specific identifier for collections of data such as objects. The cost of locating an object without an identifier can be quite expensive. Adding an identifier makes it easier to recognize that objects referred to are the same without having to compare additional data. It is to be appreciated that such a synchronization identifier or ID may be a particular column in a schema that already exists or require mapping functions to determine IDs based on data provided.

The version component 440 describes a content-type agnostic common format for exchanging information about a version of each change unit associated with each data construct, such as an object. The introduction of a version greatly simplifies the process of determining if changes have been applied on both sides of a sync operation through a comparison of version instead of a comparison of the data. Having a version implies at least two concepts. First, a common format for version information exists, and second, this format can be stored on and retrieved from a synchronization client endpoint at a change unit granularity on a per object basis.

Figure 5:
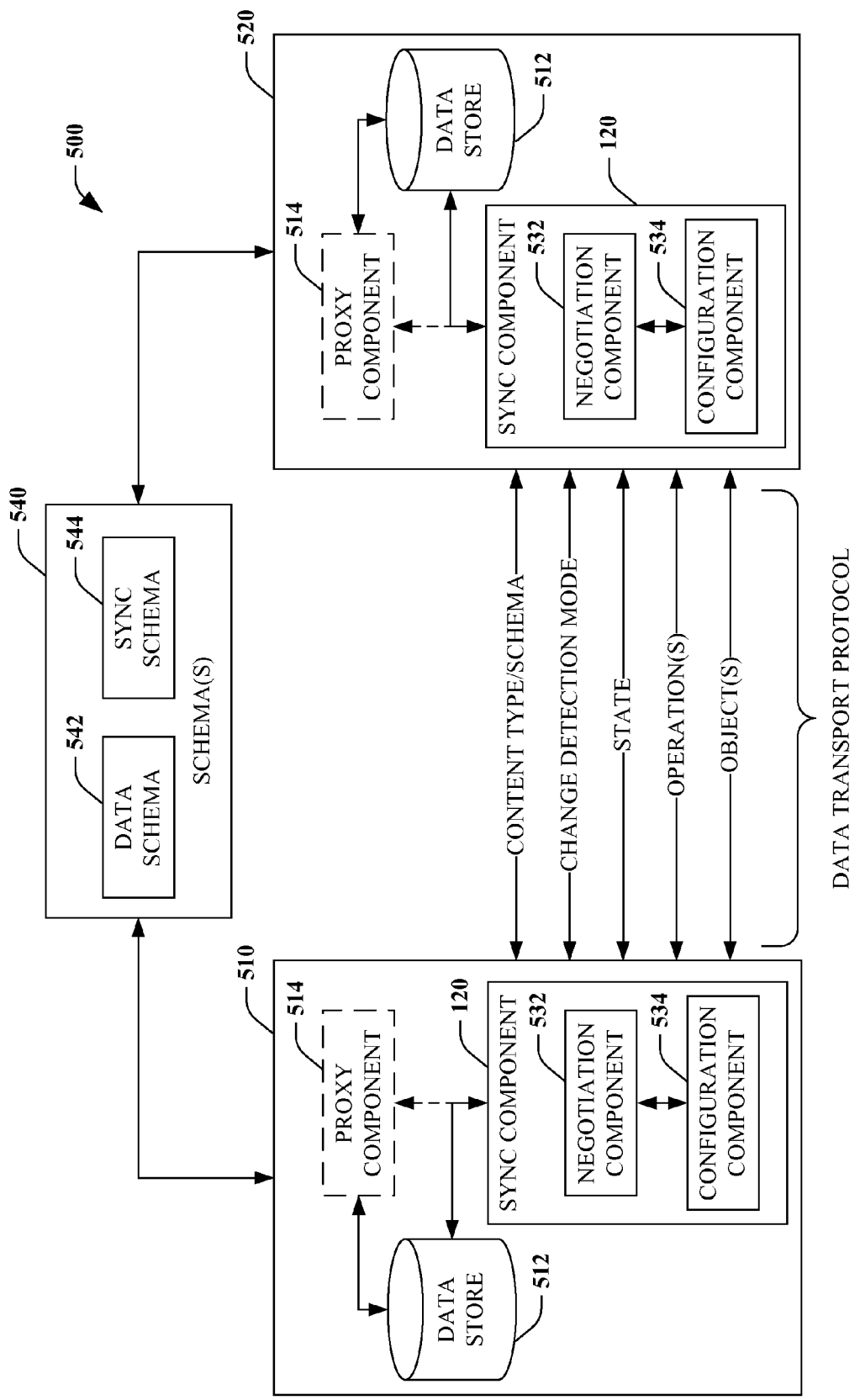
FIG. 5 is a block diagram of a system for synchronizing data between two endpoints in accordance with an aspect of the disclosed subject matter.

FIG. 5 depicts a system 500 for synchronizing data between two endpoints in accordance with an aspect of the claimed subject matter. The system 500 includes endpoints 510 and 520. Among other things, the endpoints 510 and 520 can correspond to two mobile devices or a mobile device and a desktop computer or server. Each endpoint is comprised of a local data store 512 that can be synchronized utilizing sync components 120.

Each sync component 120 includes a negotiation component 532 for negotiation of synchronization protocol and/or establishment of a sync relationship. A data transport protocol such as COM based object exchange interfaces or Media Transport Protocol (MTP), among others, can serve as the basis for endpoint communication. The negotiation component 532 facilitates identification of specific rules or procedures regarding synchronization. Accordingly, a synchronization model can be built on top of other communication protocols that support the richness of desired synchronization.

Synchronization protocol negotiation is dynamic in nature. Rather than utilizing a fixed or rigid communication scheme and set of interfaces for synchronization, as is the convention, endpoints can negotiate a protocol or relationship. When endpoints show up in a conversation, the manner in which they communicate with respect to synchronization can be determined at that time as a function of capabilities and/or preferences among other things.

Once a synchronization protocol is established via negotiation components 532, the sync components 120 can be configured with configuration component 534 to interact in a particular manner. Accordingly, the sync components 120 can comprise generic functionality that is adaptive or configurable to perform synchronization in accordance with a model rather than depending on specific pre-programmed sync behavior.

Negotiation and subsequent configuration can be dependent upon one or more schemas 540 to which endpoints 510 and 520 subscribe. In accordance with one aspect, the schema(s) 540 can be published or made public, for example as XML documents. The schema(s) 540 can include data schema 542 and sync schema 544 subcomponents. The data schema component 542 describes data to be exchanged in a synchronization process including content type and associated change units. The sync schema component 544 describes how data is exchanged to synchronize data sets. For example, the sync schema can include one or more models describing current synchronization state and change detection, among other things.

The endpoints 510 and 520 can exchange different types of information during negotiation and subsequent synchronization. As shown, information can be exchanged regarding the content type of data or identification of a schema to which the data conforms. Information about endpoint supported change detection modes and current state models is also transmitted. This information can be utilized to configure synchronization between the endpoints. Objects or other data constructs can be exchanged between the endpoints 510 and 520, where necessary. Additionally, instructions or operations can be passed to facilitate execution on a device.

Synchronization efficiency can depend at least in part upon the level of participation each endpoint is capable of in a synchronization operation. An endpoint need only identify a data schema defining content type and granularity of change information to participate in a sync operation. If an endpoint were only to offer this information, it is possible to create a synchronization solution where the other endpoint can enumerate items within the limited endpoint, discover, and apply changes on its behalf. At the other end of the spectrum, two endpoints can exchange only changes, if they are capable of independently identifying changes and determining which need to be transferred, based on state information, for instance. Here, the synchronization would be fast and efficient since the amount of extra data transferred is bound by the change unit definition not the sync operation. Between these two ends of the spectrum, a number of hybrid models exist. For each endpoint to be able to participate in the synchronization relationship, it should define its own capabilities versus what it requires from another endpoint so that sync partnerships can be created that work as efficiently as possible.

According to an aspect of the disclosed subject matter, schema(s) 540 can be standardized. By standardizing a data or object format and associated sync mechanisms, synchronization can be enabled from any source to any destination. Developers, manufacturers, vendors or the like can agree upon a number of data and/or sync schemas to allow a broader way of performing synchronization. For example, a standard contact object can include fields for first name, last name, street name, state, city, and zip code. If all or many vendors or the like utilize this format for contact objects it will enable synchronization of such objects across applications and/or architectures.

Additional schema items can be expressed for participation in a sync relationship. One of the biggest challenges in developing standardized solutions is coming to an agreement on the universe of items to be exchanged. Rather than believing that a data schema can be defined that meets the definition of everyone that wants to participate in a sync relationship, the schema can support extensibility to enable new items to be added, for example, to support custom synchronization models. For instance, a business contact manager may have no concept of an instant messaging address since instant messaging is not typically used in business communications; however, a consumer focused contact manager typically contains such a field. If the original data schema for contacts was defined without such a field, the ability for the consumer oriented version to indicate that it supports the standard schema and the addition of an instant messaging field enables other applications that understand the instant messaging field to synchronize with it. Furthermore, some clients can be configured as data taxis capable of carrying additional sync elements such as the instant messaging field without actually understanding the field.

It is further appreciated that the data transport mechanism or one or more aspects of the sync protocol may be more strongly defined via standardization processes. For example, a desktop computer platform may define a particular model for how different sync components may be registered to indicate that they both support the same schema(s) 540. Within this model, the notion of change detection and state management may be strongly defined to enable an optimal exchange pattern. However, while a base level of interoperability may be enforced by defining the default data transfer mechanism for individual objects, it would still be possible for two endpoints within this system to negotiate a richer data exchange pattern based on common knowledge of additional schema items or richer data transport models.

This model also has the benefit of enabling the introduction of proxy agents. Returning to FIG. 1, it was noted that conduit component 110 is capable of attaching to numerous data sets 112. In a system where the patterns of exchange are fixed for the desktop, a data agnostic proxy component 514 can be introduced capable of pulling data from a plurality of data sets 112, each of which potentially representative of a different set of schema(s) 540, for the purpose of synchronizing within the desktop system described. As shown, the data store 512 can be selectively coupled with the sync component 120 directly or via proxy component 514.

Figure 6:
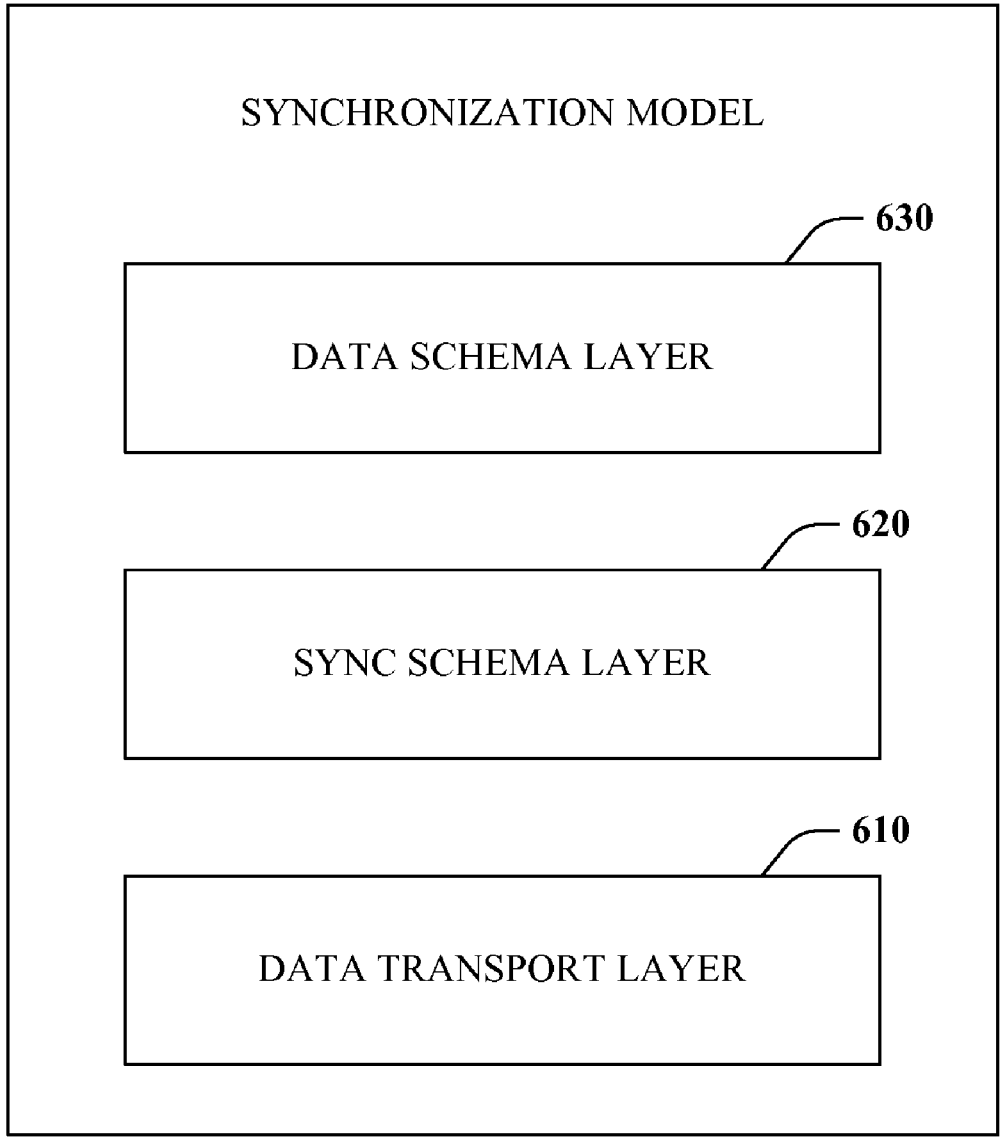
FIG. 6 is a block diagram of a synchronization model in accordance with an aspect of the disclosed subject matter.

FIG. 6 illustrates a programmatic synchronization model 600 in accordance with an aspect of the claimed subject matter. The model 600 broadly defines groups of functionality that when implemented via one or more components enables synchronization of data stored on multiple endpoints unbound by associated applications and/or architectures. Starting from the bottom and moving up, the model 600 includes a data transport layer 610, a sync schema layer 620 and a data schema layer 630.

The data transport layer 610 enables communication between endpoints. By way of example and not limitation, a rich communication protocol such as COM interfaces or MTP can be utilized that enables exchange of objects as well as various other device and content information. Thus, layer 610 provides a base or foundation for data exchange across endpoints or endpoint devices.

The next layer is the sync schema or model layer 620 that defines data exchange with respect to effectuating synchronization. Thus, layer 620 provides additional synchronization directed constraints on data exchanged over the primitive data transport layer 610. Various data exchange models and mechanisms can be defined and/or supported by sync schema layer. For example, the sync layer 620 can provide a content-type independent model for describing current state, a context specific identifier for data constructs, a content-type independent format for exchanging version information for each change unit, a way to express additional schema items for participation in a sync relationship, a method for indicating the fidelity with which a particular item in the object schema can be maintained and/or a manner for indicating a level of participation each endpoint is capable of in a sync operation.

Finally, the data schema layer 630 describes data to be exchanged in a synchronization operation. There can be two aspects to this including a content-type or object schema and change unit granularity. In other words, the format of data and the units of change associated with the data.

To aid further clarity with respect to model utilization, consider a synchronization scenario in which contact data is synced from a mobile phone to a desktop computer. Each device includes a contact store that may or may not support synchronization. The devices are able to exchange objects defined in accordance with an object schema across an object exchange protocol. The manner in which objects are exchanged can be dependent upon the sync schema implemented by the mobile device. If the device implements a change detection model and/or other synchronization functionality, it can detect and return changes to the desktop component in accordance with such functionality. Alternatively, the mobile device may not implement any sync schema, for example, where the device vendor is not willing to invest in such technology, and force the desktop device to enumerate it fully.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed with respect to negotiation of sync protocol and/or configuration of sync components. For instance, endpoint capabilities and/or preferences can be inferred as a function of device type or other contextual information implicitly or explicitly collected and synchronization configured accordingly.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
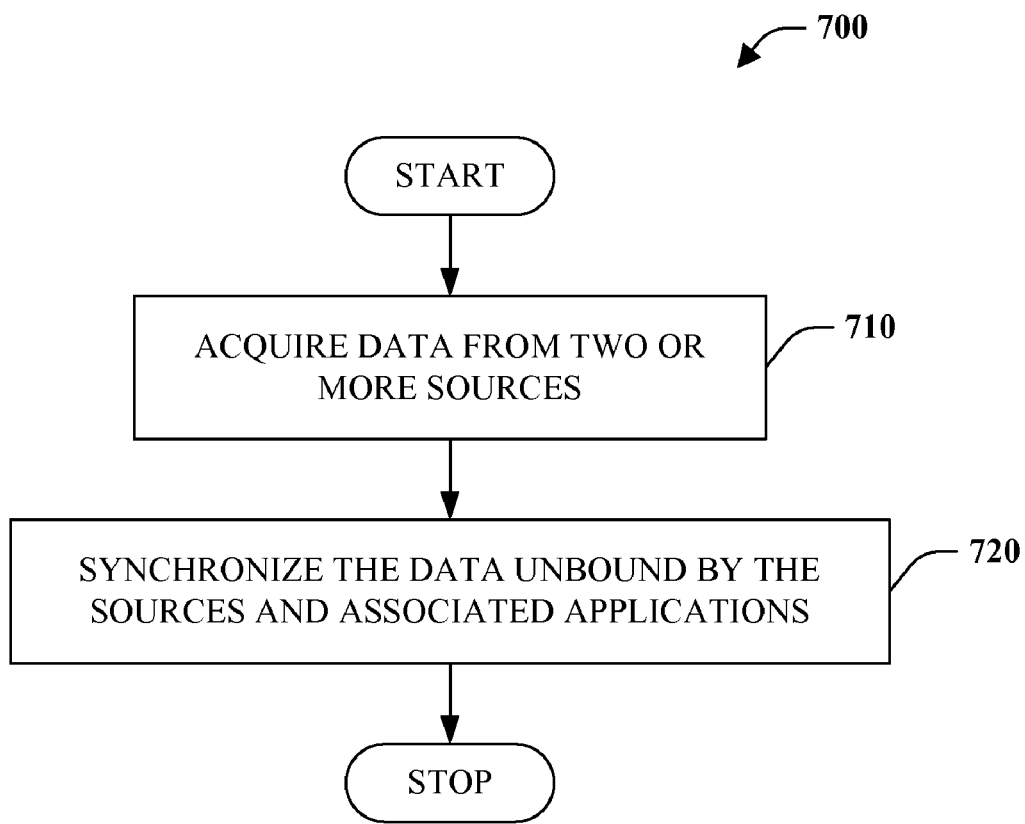
FIG. 7 is a flow chart diagram of a method of data synchronization in accordance with an aspect of the disclosed subject matter.

Referring to FIG. 7, a method of data synchronization 700 is depicted in accordance with an aspect of the claimed subject matter. At reference numeral 710, data is acquired from two or more sources. At 720, the sources are subsequently synchronized unbound by associated applications, endpoints, architectures, or the like. The focus is on data to be synchronized rather than applications or endpoints being synchronized. In other words, synchronization is data-driven.

Conventionally and as previously described, synchronization is confined to custom application sync solutions, which are limited scope. If such a solution does not provide support for a particular data source or elements in a data set, that data cannot be synchronized. Sometimes a sync vendor will make their system available to third parties to allow them to create providers that work at the ends of the pipe to encourage a broader sync ecosystem. However, this locks in synchronization to a particular vendor and limits the reach of such synchronization. Thus, device vendors have either to forgo sync functionality or incur the cost of generating their own custom solution.

Method 700 provides for a much broader approach to synchronization that is in a sense independent of these factors. In one implementation, a protocol-based approach is employed that defines how information is exchanged to effect synchronization across data sets. As a result, the only barrier to entry is simply implementation of a protocol and a set of standards as opposed to licensing software from a third party, for example. Stated differently, synchronization is bound to data and a set of synchronization behaviors as opposed to a particular application or architecture.

Figure 8:
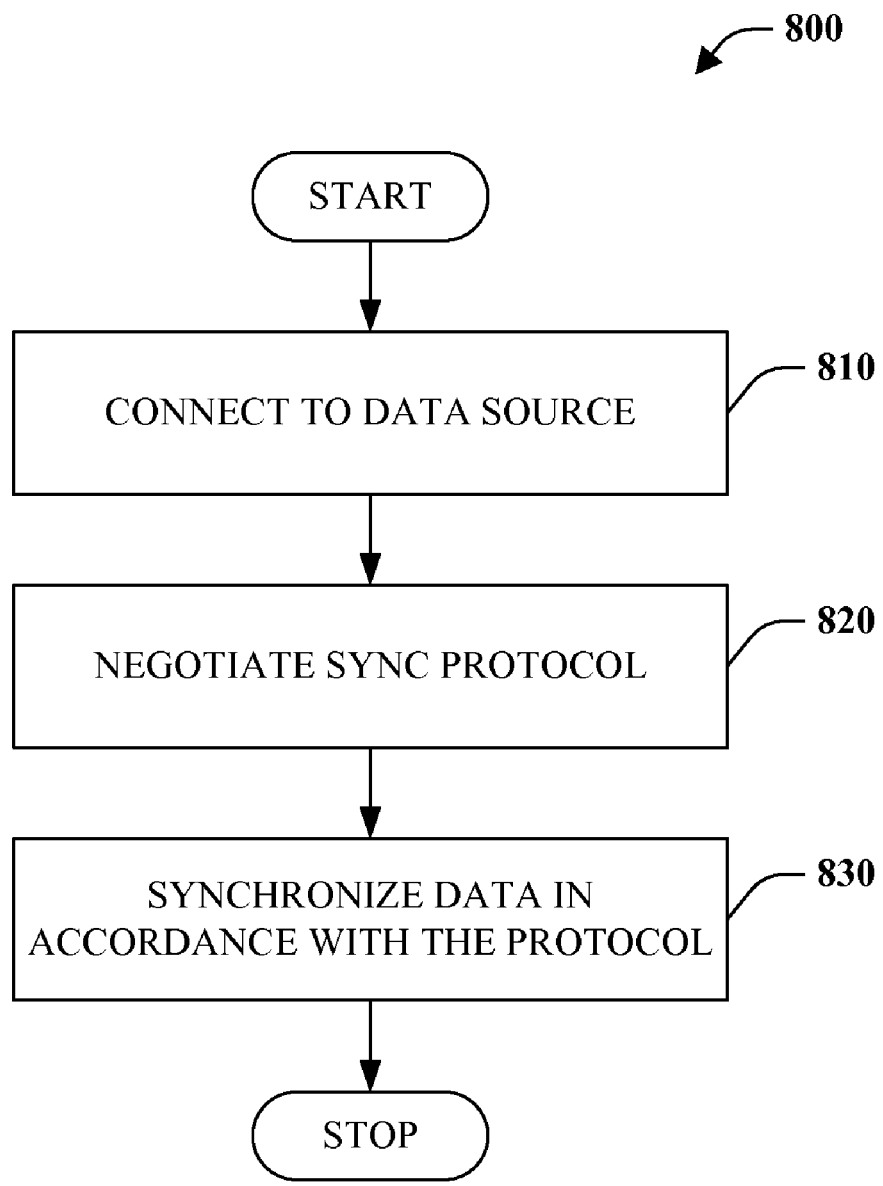
FIG. 8 is a flow chart diagram of a method of synchronization in accordance with an aspect of the disclosed subject matter.

FIG. 8 is a flow chart diagram of a synchronization method 800 in accordance with an aspect of the claimed subject matter. At reference numeral 810, data sources are communicatively connected, for example utilizing a base communication protocol such as MTP or the like. A synchronization protocol is negotiated next at numeral 820. In one instance, this can correspond to identifying which of a number of standard or preset, schemas, models and/or mechanisms are implemented by each endpoint in conversation and determining an overall model to efficiently synchronize data based thereon. The model can be selected based solely on selecting the highest-level or richest sync model supported by endpoint data sources and/or utilizing additional information such as endpoint preferences and context (e.g., load, processing power . . . ). At numeral 830, data can be exchanged in accordance with the negotiated communication protocol and synchronized across two or more sources.

Figure 9:
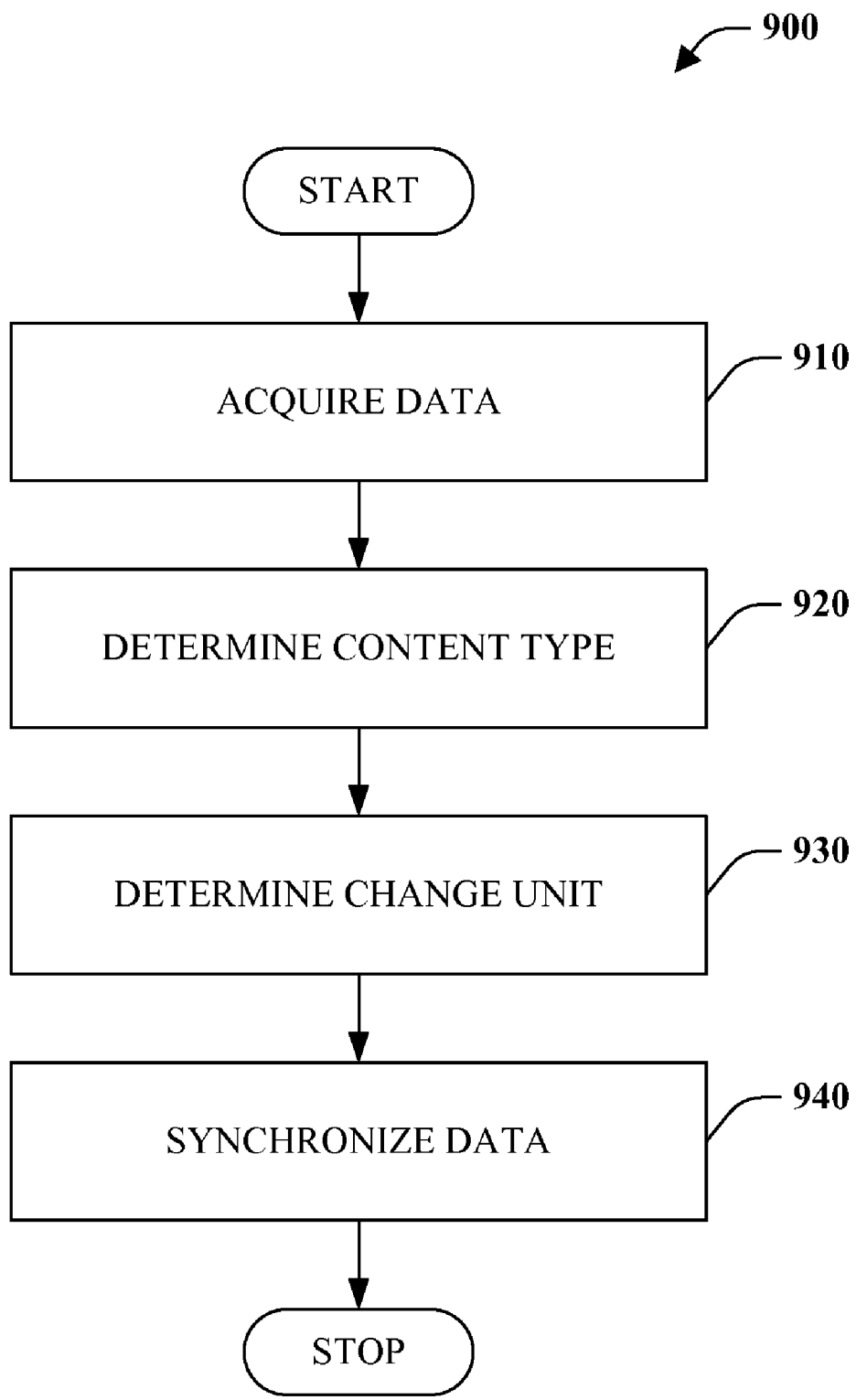
FIG. 9 is a flow chart diagram of a synchronization method utilizing a data schema in accordance with an aspect of the disclosure subject matter.

FIG. 9 depicts a method of synchronization 900 utilizing a data schema in accordance with an aspect of the claimed subject matter. At numeral 910, data is acquired or otherwise accessed for purposes of synchronization using a predetermined or negotiated communication protocol. At reference numeral 920, data content type is determined. This information can be acquired directly from an endpoint associated with the data and/or an external schema. In accordance with one aspect, the content-type is standardized to facilitate data exchange independent of applications and/or architectures among other things. For instance, the content type can be a contact object or media file with an associated schema document defining aspects of the information to be synchronized. At reference numeral 930, a change unit associated with the content type is determined, for example in the same or similar manner as the content type itself. By way of example, mailing address can comprise a single change unit such that street, city, state, and zip code are always exchanged as a group, whereas email address can be a separate change unit. At reference 940, data is synchronized in utilizing the data schema. For example, a synchronizing endpoint can enumerate the data, identify changes, and effect those changes with respect to its data.

Figure 10:
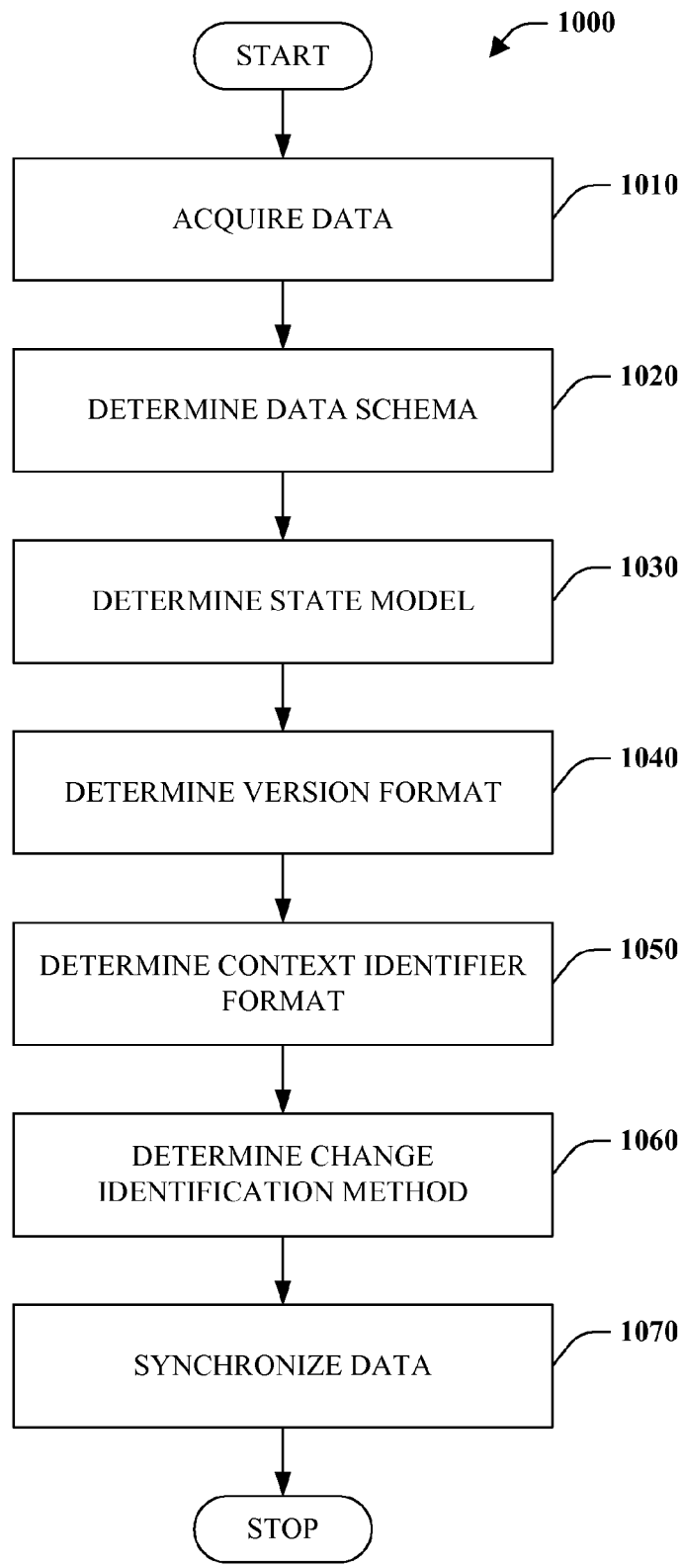
FIG. 10 is a flow chart diagram of a method of synchronization utilizing data and sync schemas in accordance with an aspect of the disclosure.

FIG. 10 is a flow chart diagram of a method of synchronizing data 1000 utilizing data and sync schemas in accordance with an aspect of the claimed subject matter. Data is acquired or otherwise accessed at numeral 1010. At reference numeral 1020, a data schema is determined for example including identification of content type and change unit granularity. At numeral 1030, a content type agnostic model is determined that describes current synchronization state. This can aid the synchronization process by not requiring analysis of each item in a change set to discover changes but rather comparing states. At reference 1040, a content type agnostic version format for identifying versions of data at the change unit level is determined. A context identifier format is identified, at 1050 that facilitates locating the same data constructs, such as objects, without comparing the data. At numeral 1060, a change identification method is identified such as full enumeration or anchor based, among others. All information determined from acts 1030 to 1060 can be communicated directly from endpoints associated with data to other endpoints or indirectly through identification of an external schema, inter alia. Furthermore, the information can correspond to identification of a one of a plurality of standard or published schemas, models, types, etc. At reference numeral 1070, data can be synchronized in accordance with the data schema and sync information gathered. For example, data defined in accordance with the data schema is scrutinized to determine changes in accordance with the change detection method as well as state, version and/or identifier information and exchanged to ensure data is synchronized.

As used herein, the terms "component," "system" and the like are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
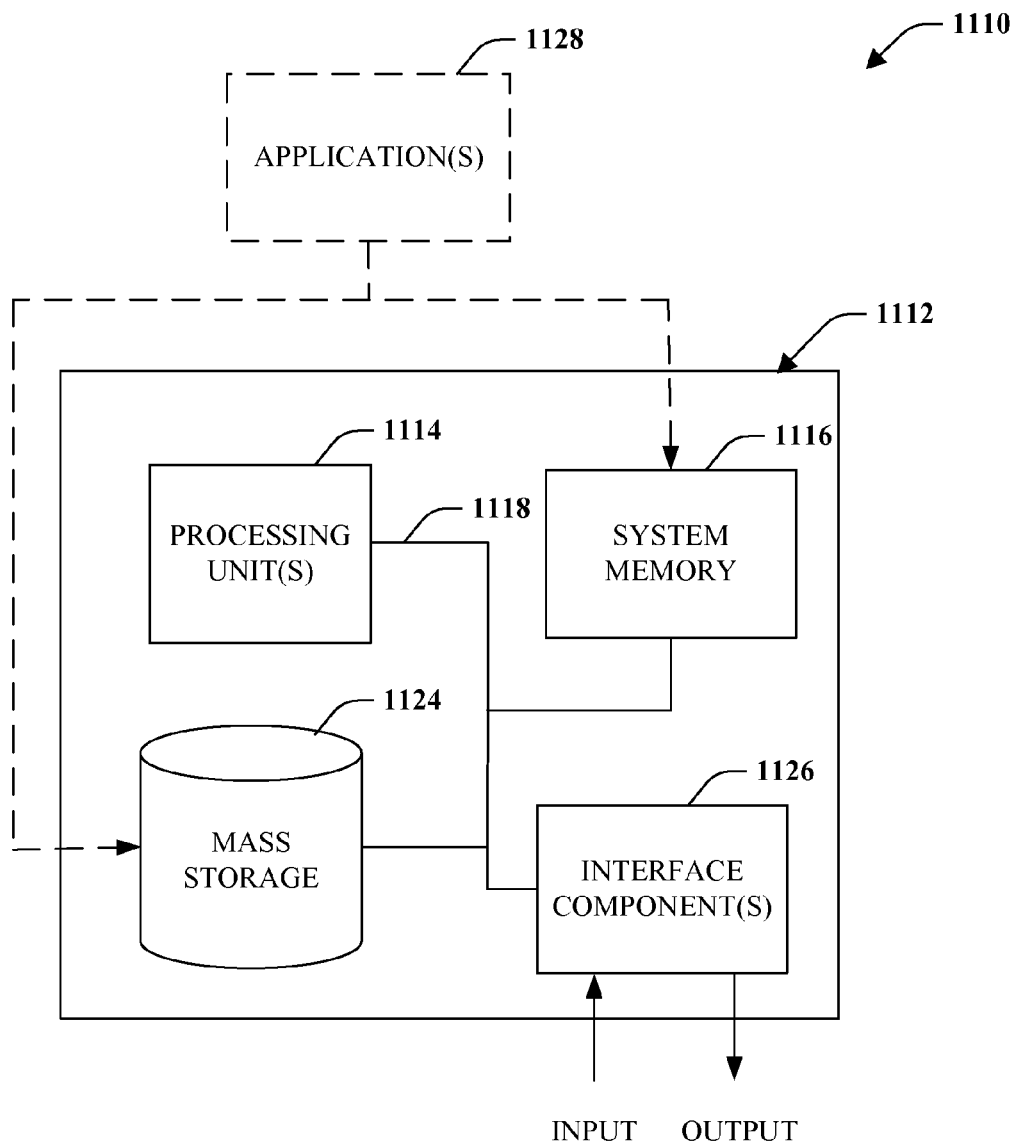
FIG. 11 is a schematic block diagram illustrating a suitable operating environment for aspects of the subject disclosure.
Figure 12:
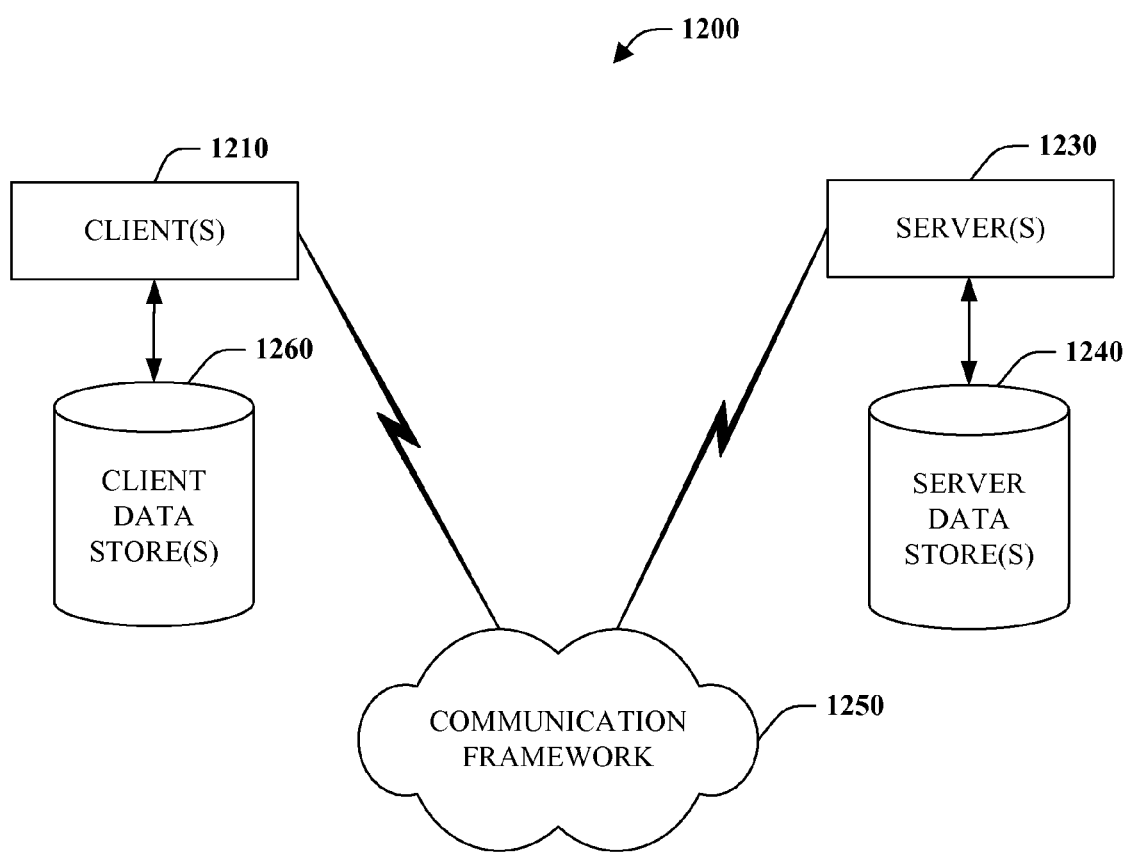
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, non-volatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g. CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect to synchronization as described herein. By way of example, a client 1210 such as a mobile device (e.g., phone, personal digital assistant, laptop, media player . . . ) including a data store 1260 can seek to synchronize with a server 1230 and associated data store 1240 utilizing the communication framework 1250. For instance, changes made to data on an individual's laptop computer can be synchronized with corresponding data on a business server. Furthermore, clients 1210 can publish and/or access standard schemas, models, protocols or the like on one or more server data stores 1240 to facilitate sync engine/component configuration.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A data synchronization system, comprising at least one processor coupled to at least one machine-readable storage medium storing instructions executable by the at least one processor to implement:
 a conduit component configured to enable interaction between two or more data sets;
 a synchronization component configured to facilitate data-driven synchronization of the data sets,
 wherein
 the synchronization component comprises a change detection component configured to describe a manner, among a plurality of possible manners based on respective capabilities of endpoints associated with the two or more data sets, in which changes in at least one of the two or more data sets are to be identified, and the synchronization component is further configured to, after the change detection component describes the manner, perform synchronization of the two or more data sets in accordance with the described manner, and
 wherein the synchronization component is configured to be coupled, based on a corresponding selection, either directly to a data store of at least one of the endpoints, or to the data store via a proxy component.

2. The system of claim 1, further comprising a data schema component configured to define data set data structure for synchronization.

3. The system of claim 2, wherein the data schema component is configured to associate a change unit with a data object in the at least one of the two or more data sets, based at least partly on a frequency with which the data object changes.

4. The system of claim 3, wherein the data schema component is configured to specify content type.

5. The system of claim 1, further comprising a sync model component configured to describe a current state of the two or more data sets, a context-specific identifier for data constructs, a content-type independent format for exchanging version information for each of change units associated with the changes, a way to express additional schema items for participation in a synchronization relationship, a method for indicating a fidelity with which an item in an object schema can be maintained, and a manner for indicating a level of participation each of the endpoints associated with the two or more data sets is capable of in a synchronization operation define.

6. The system of claim 1, wherein the manner in which changes are identified includes at least one of utilizing a full enumeration model, utilizing an anchor-based approach or utilizing a web service.

7. The system of claim 5, wherein the synchronization component is further configured to, based on a synchronization protocol negotiated between the endpoints, select a highest-level synchronization model supported by the endpoints.

8. The system of claim 3, further comprising:
a sync model component including
an identifier component configured to provide an identifier for each of the data object and at least one other data object, and
a version component configured to describe a format for exchanging version information about a version of the change unit associated with the data object and a version of a change unit associated with the at least one other data object;
wherein the synchronization component is further configured to locate the data object and the at least one other data object using their respective identifiers, and synchronize the two or more data sets based on the respective identifiers and version information of the data object and the at least one other data object.

9. The system of claim 8, wherein the synchronization component is further configured to determine that the data object and the at least one other data object are the same based on their respective identifiers.

10. The system of claim 1, wherein the data sets, or segments thereof, conform to an extensible content type schema.

11. A method, comprising:
determining content type and change units for a data set;
selecting, based on at least one of capabilities or preferences of an endpoint associated with the data set, a change identification method from among a plurality of predefined identification methods, the change identification method for describing a manner in which changes in the data set are to be identified; and
synchronizing the data set across two or more data stores as a function of the content type, change units and selected change identification method.

12. The method of claim 11, further comprising, based on a common format for version information of the two or more data stores, retrieving the format from at least one of the two or more data stores at a change unit granularity on a per object basis.

13. The method of claim 11, further comprising, based on the two or more data stores having different formats, performing a transformation of the different formats to a standardized format pursuant to the synchronizing.

14. The method of claim 11, further comprising, based on a comparative frequency of changes to items in the data set, designating a subset of the items as a change unit separate from another subset of the items.

15. The method of claim 11, further comprising synchronizing the data set utilizing context specific identifiers that identify identical data constructs.

16. The method of claim 11, further comprising synchronizing the data utilizing content agnostic versioning information associated with the change units.

17. The method of claim 11, further comprising acquiring the content type and change units from a public schema.

18. The method of claim 11, the synchronizing including selecting a highest-level synchronization model supported by the two or more data stores as a synchronization protocol.

19. A computer-readable storage medium storing instructions, the instructions to, if executed by a computing device, cause the computing device to perform operations comprising:
negotiating a synchronization protocol between two or more endpoints as a function of a synchronization model that defines how data is exchanged and a data schema that describes the data to be exchanged;
exchanging a change detection mode between the two or more endpoints as part of the negotiating; and
configuring synchronization in accordance with a negotiated synchronization protocol.

20. The computer-readable storage medium of claim 19, the operations further comprising, pursuant to the negotiating, exchanging information concerning an extension of the data schema.

* * * * *